Inventor
J. McLean Kingsbury,

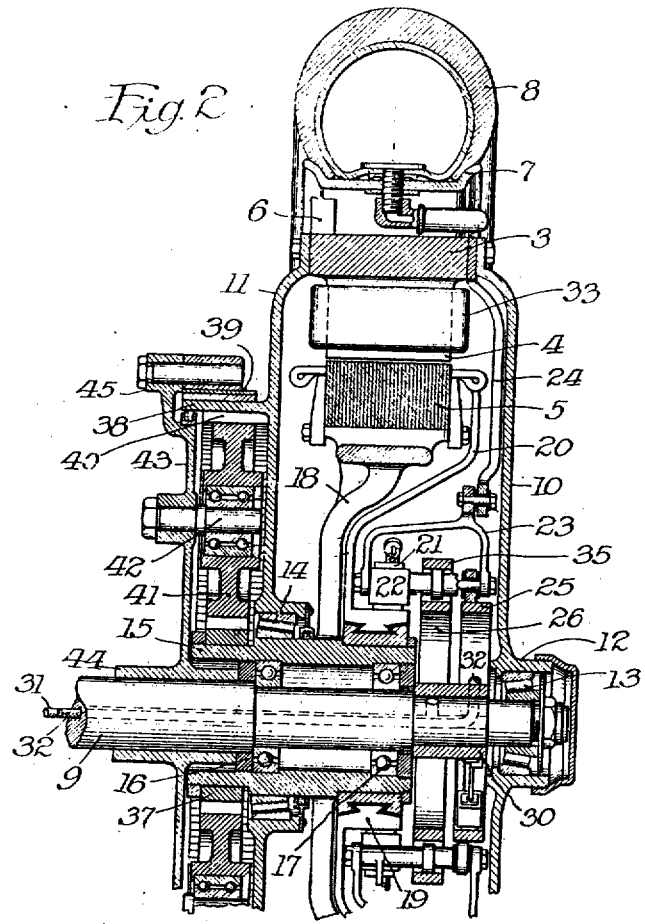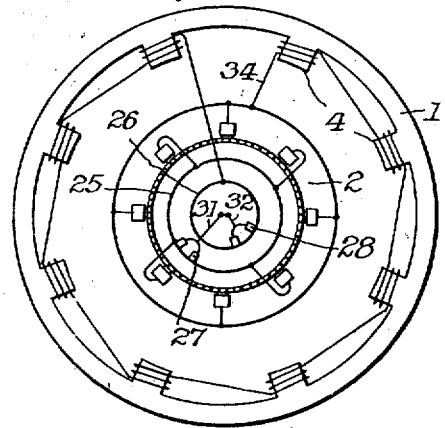

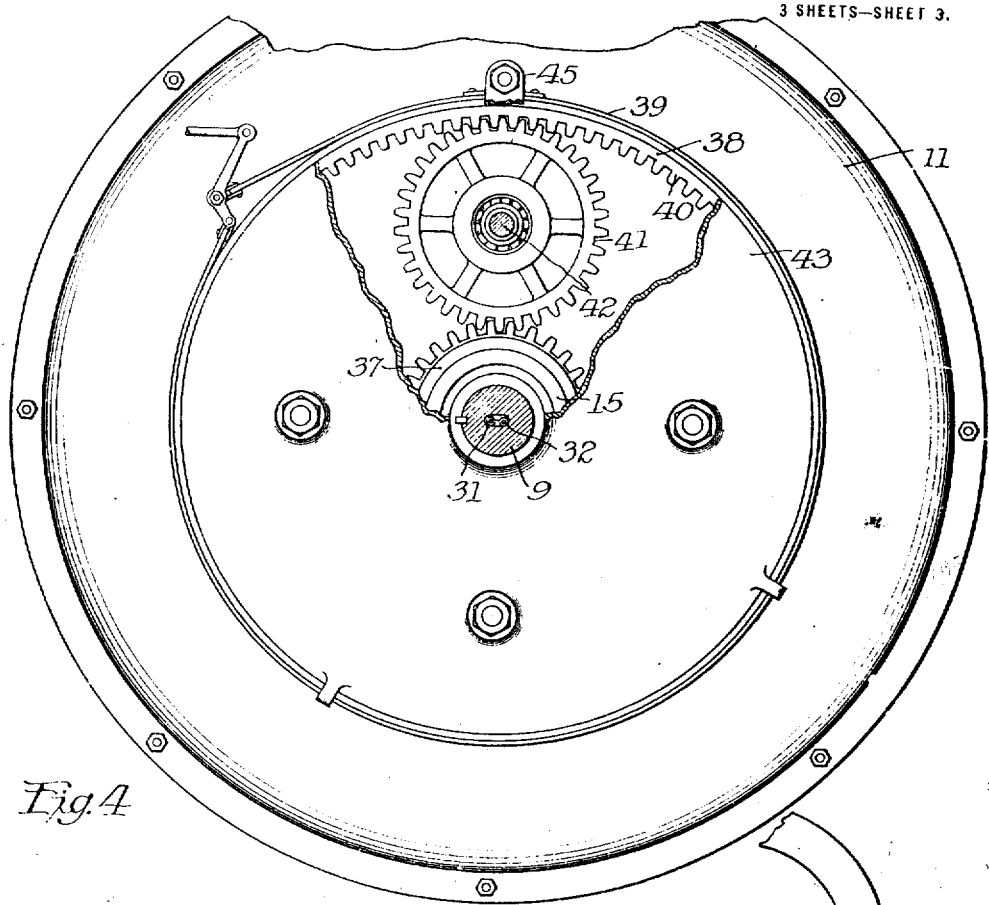

UNITED STATES PATENT OFFICE.

JOHN McLEAN KINGSBURY, OF GREAT FALLS, MONTANA, ASSIGNOR TO KINGSBURY GAS-ELECTRIC MOTOR CAR COMPANY, OF GREAT FALLS, MONTANA, A CORPORATION OF MONTANA.

ELECTRIC-VEHICLE CONSTRUCTION.

1,270,421. Specification of Letters Patent. Patented June 25, 1918.

Application filed June 10, 1915. Serial No. 33,301.

*To all whom it may concern:*

Be it known that I, JOHN MCLEAN KINGSBURY, a citizen of the United States, residing at Great Falls, in the county of Cascade and State of Montana, have invented a certain new and useful Improvement in Electric-Vehicle Construction, of which the following is a full, clear, concise, and exact description, reference being had to the accompanying drawings, forming a part of this specification.

The present invention relates to electric vehicle construction.

In the construction of electric vehicles one great difficulty experienced heretofore in the art has been the large gear ratio required between the driving motor and the driven wheel. One solution is to decrease the speed of the motor, but this decreases its power and if the motor is made larger, increased space is required. One object of my invention is to provide an improved electrical driving structure in which large gear ratios are eliminated. A further object is to provide a motor in which the peripheral speed of the armature with respect to the field is relatively high but in which the resulting driving speed is relatively low. A further object is to provide a combined wheel and motor structure of improved construction.

According to my invention the two coöperating motor elements, namely the field and the armature rotate in opposite direction, the resulting driving speed being the difference between the two speeds. In order to secure the desired differential action the field and the armature are geared together in any suitable manner so that the rotational effort exerted between the field and armature can be used as tractive efforts to drive the vehicle. In the particular structure which I employ this tractive effort is applied directly at the periphery of the driving wheel. As a consequence of the two parts being geared together application of the brakes to the part which is secured to the wheel felly and tire stops both rotating elements.

I shall now describe my invention with particular reference to the accompanying drawings which illustrate one embodiment in which my invention may appear.

Fig. 2 is a vertical diametrical section.

Fig. 3 is a diagram of the electrical connection.

Fig. 4 is a rear elevation with parts broken away.

Fig. 5 is a detail view of the brush holder, and

Fig. 6 is a view taken at right angles to Fig. 5.

Figure 1:
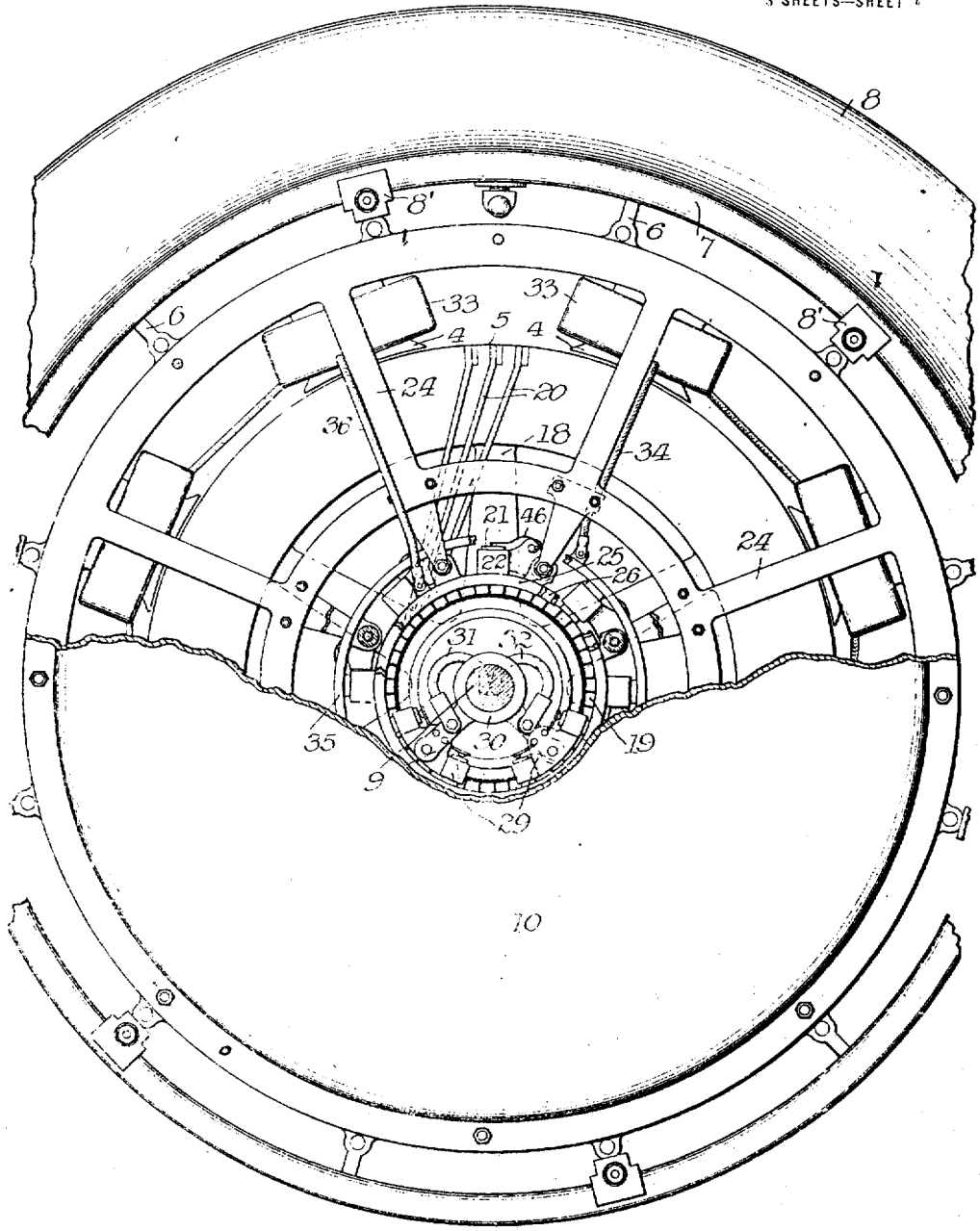
Figure 1 is a side elevation with parts broken away to reveal the interior construction.

The motor which I have chosen to illustrate my invention is built into a wheel structure and comprises a rotating field 1 (see Fig. 3) and an oppositely rotating armature 2. The field frame comprises an annular ring 3 of iron or soft steel having the pole pieces 4 distributed at suitable positions on the interior thereof and projecting adjacent the laminated ring 5 which forms the magnetic structure of the armature. The field frame 3 bears a plurality of studs or spokes 6 which fit radially within the felly or rim member 7 which in turn bears a suitable tire 8, shown in the present case, as the well-known pneumatic tire. The spokes 6 fit around the side of the felly 7 so as to prevent disengagement of the parts sidewise. The felly or rim 7 is prevented from movement on the other side by the well-known clips or clamping blocks 8' which are clamped against the side of the rim by bolts or the like. The field frame 3 is supported from the stationary axle 9 by means of the plates or disks 10 and 11 upon the outside and the inside of the wheel respectively. These disks are clamped to the frame at their outer periphery and each is provided with suitable bearings to allow the wheel structure thus formed to rotate with respect to the stationary axle 9. The outer disk 10 is provided with the hub 12 in which are mounted roller bearings 13 mounted directly upon the outer end of the axle 9. The inner disk 11 is provided with roller bearings 14 forming a suitable bearing upon a sleeve member 15 which is itself mounted for rotation upon the stationary axle 9 by means of the bearings 16 and 17.

The sleeve 15 which carries the bearings 16 and 17 upon the shaft 9 is fastened to the armature structure 5 by means of the spider 18. This sleeve 15 also carries the commutator bars 19 which are connected by the leads 20 to the armature winding.

A plurality of suitable brushes 21 bear upon the commutator and provide suitable connections for energizing the armature winding. The brush holders 22 which support the brushes 21 are secured by suitable yoke members 23 to a spider frame 24 which has an outer annular rim member clamped between the outer disk 10 and the field frame 3.

The yoke members 23 support a pair of collector rings, alternate ones of these brush holders 22 and brushes 21 being connected to one of said rings. The brushes and the collector rings 25 and 26 thus rotate together as the wheel rotates about the axle 9.

A plurality of brushes 27 and 28 bear upon the collector rings 25 and 26 respectively. These brushes are supported in suitable brush holders 29 fastened by a bracket to an annular casting 30 which is mounted upon the stationary axle 9. The axle 9 is preferably hollow so as to receive the conductors 31 and 32 which are connected through suitable control devices to a storage battery or similar source of current.

The field windings 33 are connected in series, one terminal 34 being connected through the medium of the ring 35 to alternate ones of the brushes 21, the other field terminal 36 being connected to one of the collector rings 25 and 26, the other of which is connected to the remainder of the brushes 21.

It is to be understood of course that these connections may be varied to suit conditions, as for instance a number of multiple paths through the field may be provided and a greater or less number of paths through the armature may also be provided. Where a reversal of direction of driving is desired, the terminals of the field with respect to the armature, or vice versa, are reversed. This may be provided for by slip-ring connection and a suitable controller.

I shall now describe the manner in which the field and armature are connected together to secure a suitable tractive effort at the rim of the wheel.

If the field and armature were not connected together but were free to rotate in opposite directions the field being attached to the rim and tire of the wheel would start less easily and as a consequence the armature alone would spin. I provide a positive gearing between the field and armature such that the field is compelled to move upon movement of the armature. The sleeve 15 has secured thereto a spur gear 37 which rotates with the sleeve 15 and with the armature 2. The inner disk 11 which is secured to the field frame 3 is provided with an annular flange 38 which forms on its outer periphery a brake drum adapted to be engaged by a suitable brake band 39 and which has mounted on its inner periphery the internal gear 40 which is secured thereto and rotates therewith. A plurality of idler wheels 41 mesh with the internal gear 40 and the spur gears 37. These idlers 41 are mounted upon suitable studs 42 forming part of a stationary frame element 43 which I have shown as a disk secured at its hub 44 to the stationary axle 9. The brake band 39 is secured to the frame member as by means of the bracket 45 in any suitable manner.

In Fig. 5 I have illustrated one manner in which the centrifugal action of the brushes 21 may be counterbalanced. The brush 21 is held in its holder 22 by means of a spring 46 which is given the proper initial tension to secure good contact between the commutator and the brush 21. The spring 46 is secured to a rotatable pin 47 which is provided with a counterbalance arm 48 having an adjustable counterbalance 49 which may be set so as to counteract the centrifugal action upon the brush 21 as the parts rotate.

The operation of the mechanism will be readily understood from the foregoing description. The field and armature are energized to produce relative movement between them. The field is secured to the tire, which in effect forms a brake, the force exerted upon which tends to drive the vehicle. Movement of the field and wheel in one direction is accompanied by movement of the armature in the opposite direction, but as the two parts are geared together the entire tractive effort is delivered at the rim of the wheel. Application of the brake tends to retard the rotation of the field structure to which the wheel tire and rim are secured. This results in a slowing down of the moving parts and eventual stopping of the vehicle.

Due to the decrease in gear ratio which is thus effected, operation of the mechanism is accompanied by very little noise and is characterized by smooth and silent operation.

While I have shown and described one specific embodiment of my invention, I do not intend to be limited to the details of construction shown and described herein, but intend that all such modifications and variations as will suggest themselves to those skilled in the art be considered as coming within the spirit and scope of my invention.

What I claim as new and desire to secure by Letters Patent of the United States is the following:

1. In combination, a motor field element, a relatively stationary shaft, a rotatable sleeve mounted on said shaft, a motor armature element secured to said sleeve, a pair of disks secured to said first motor element, said disks having bearings concentric with said shaft, one of said bearings being upon said sleeve, a central gear mounted on said sleeve and an internal gear mounted on one of said disks, a relatively stationary idler gear meshing with said other gears, a stationary cover plate or disk for covering the side of said gears, said idler gear having pivotal mounting in said cover plate, a cylindrical flange extending from the adjacent disk and inclosing said gears, said flange forming a brake drum and a brake band secured to said cover plate or disk for retarding the motion of said motor field element.

2. In combination, a rotatable motor field, a rotatable armature coöperating therewith, a commutator, a spider secured to said field and rotatable therewith, a stationary shaft for said field and armature, a rod secured to but insulated from said spider, a brush for said commutator, said brush being secured to said rod, a collector ring secured to said rod and rotating with said spider and field, a stationary brush mounted on said shaft and coöperating with said collector ring.

3. In combination an annular field, a shaft, a sleeve having bearings upon said shaft, a pair of side plates for inclosing said field, said plates having bearings upon the sleeve and the shaft respectively, a gear secured to said sleeve, said gear being concentric with said shaft, an internal gear secured to one of said side plates, said internal gear being concentric with said shaft, a plate for covering the side of said internal gear, said plate being secured rigidly to said shaft, a bearing stud connected to said plate, and a connecting gear having a bearing on said stud and meshing with said first gear and said internal gear.

4. In combination an annular field, a shaft, a sleeve having bearings upon said shaft, a pair of side plates for inclosing said field, said plates having bearings upon the sleeve and the shaft respectively, a gear secured to said sleeve, said gear being concentric with said shaft, a cylindrical flange on one of said plates, an internal gear secured to said plate within said flange, said internal gear being concentric with said shaft, a plate for covering the side of said internal gear, said plate being secured rigidly to said shaft, a bearing stud secured to said plate, a connecting gear having a bearing on said stud and meshing with said first gear and said internal gear, and a brake band for engaging said flange, said brake band being secured to said stationary plate.

In witness whereof, I hereunto subscribe my name this first day of June A. D. 1915.

J. McLEAN KINGSBURY.